June 24, 1969 L. D. KAY 3,451,880

DATA TAPE WITH POSITION IDENTIFICATION MEANS

Filed Feb. 10, 1964

Inventor:
Lewis D. Kay
By: Hofgren, Wegner, Allen, Stellman & McCord
Attorneys.

United States Patent Office 3,451,880

Patented June 24, 1969

3,451,880
DATA TAPE WITH POSITION IDENTIFICATION MEANS

Lewis D. Kay, Palatine, Ill., assignor to Uarco Incorporated, a corporation of Illinois Filed Feb. 10, 1964, Ser. No. 343,690
Int. Cl. B44f *1/00;* B32b *3/10;* G01d *15/34*
U.S. Cl. 161—6 1 Claim

ABSTRACT OF THE DISCLOSURE

A color coded data processing tape which has a metallic core and will receive punched information holes offset from the center line of the tape, colors on opposite sides of the tape being different enabling the front end of the tape to be distinguished from the trailing end of the tape.

This invention relates to data tape and more particularly to an improved coding means.

Data tape of the type having selected holes punched in the tape to encode a program which may be sensed by appropriate sensing means has found a great deal of use in modern industry. The airplane and aerospace industry in particular has found such tape extremely useful since it is particularly suitable for use in numerical control, such as in testing sequences for guided missiles or the like. The tape is usually suitably programmed by providing a series of control punched holes offset from the tape longitudinal center line to facilitate pin feeding and control of the tape and by providing code holes for encoding the appropriate program into the tape. The program which is encoded may take up only a few feet or several hundred feet of the tape, depending upon the length of the program. In either event a problem has arisen in that there is no way of telling the front end of the tape from the back end and, unless the tape is rewound correctly, the tape may be run in reverse into the sensing means so that no intelligible program may be sensed.

This problem becomes even more acute when the basic nature of the tape is considered. Typically, the tape is less than .01 in thickness and comprises a laminate of a plurality of layers of material. Accuracy is extremely important and finite tolerances must be maintained. It thus becomes desirable to provide a means in such a tape for identifying the top and bottom faces and front and rear ends of the tape.

It is therefore a general object of this invention to provide a new and improved means for coding data tape.

It is another object of this invention to provide a means for identifying the appropriate direction of data tape feeding through the use of color coding the respective faces of the tape.

It is a further object of this invention to provide a means for indicating the proper direction of feeding laminated data tape into an appropriate sensing device by providing different colored adhesives on either side of an opaque core of the laminated tape to distinguish the top and bottom faces of the tape from each other.

Other objects, features and advantages of the present invention will be apparent from the following description of the preferred embodiment illustrated in the accompanying drawings, in which.

Figure 1:
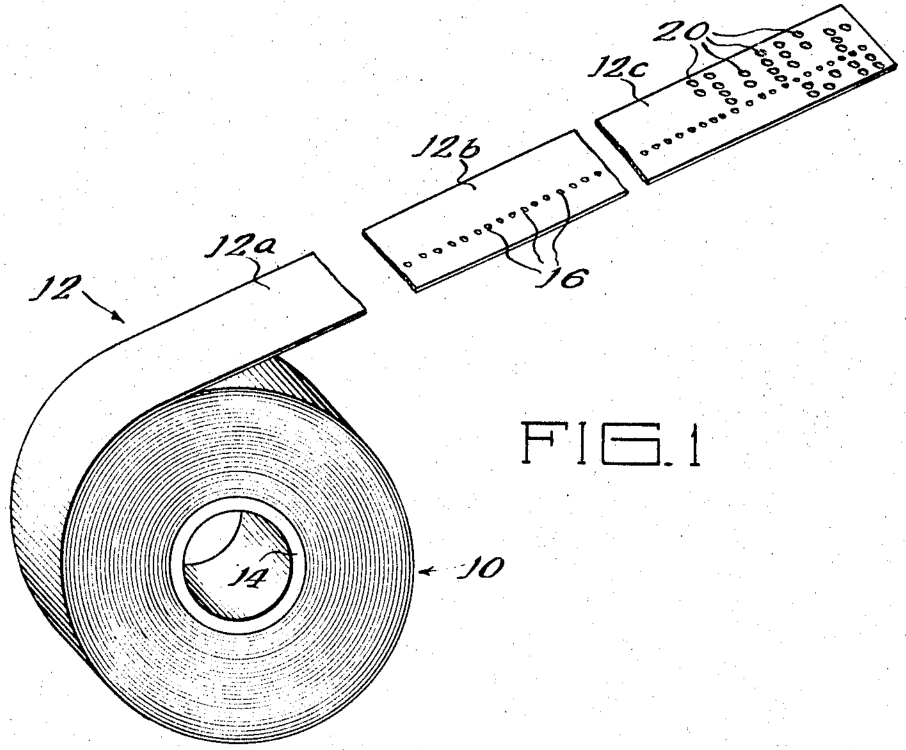
FIGURE 1 is a broken perspective view of a tape roll showing tape being unwound from the roll and showing successive portions of the tape after control punched holes have been punched through the tape and a specific program has been encoded in the tape.

Referring now to the drawings, in FIGURE 1 there is shown a tape roll 10 comprising a continuous tape strip 12 wrapped about a central core 14. The leading end of the tape strip 12 is broken into three segments, such as 12*a*, 12*b* and 12*c* illustrating the three stages through which the data tape passes as it is encoded with a given program. That portion of the tape 12*a* which is first presented into the programming device is not provided with any information or guiding means. Portion 12*b* is provided with suitable control punched holes, such as 16, along a line offset from the longitudinal center line of the tape for the reception of upstanding pins 18 for driving the tape through engagement with well known pin feed type mechanisms. The third stage, illustrated by portion 12*c*, is provided with a plurality of program holes 20, which have been punched through the tape in a fashion to encode a particular program on the tape which may be sensed by suitable means to obtain the desired information from the tape.

Figure 2:
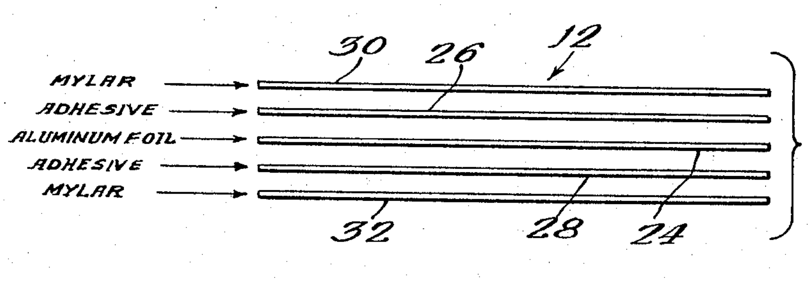
FIGURE 2 is an enlarged exploded view of a layer of the data tape of this invention.

Data tape suitable for programming by having random holes punched through the tape must meet a variety of rigid standards. The tape must be extremely thin and yet strong enough to receive the hole punching without tearing or shredding or the like. Close tolerances are extremely necessary. Of necessity, the tape must be extremely thin, further complicating the problem of tape strength. It has been found that a laminate, illustrated in exploded form in FIGURE 2, is particularly suited for this purpose. The center of the tape is an opaque strip, such as aluminum foil 24, preferably approximately .00035" in thickness. An adhesive layer, such as 26 and 28, is applied on either side of the strip, over which is positioned strips of a suitable clear material 30 and 32, such as that known commercially as "Mylar," forming the laminated data tape structure. The clear strip of Mylar is also relatively thin, being in the order of .0015" in thickness.

Figure 3:
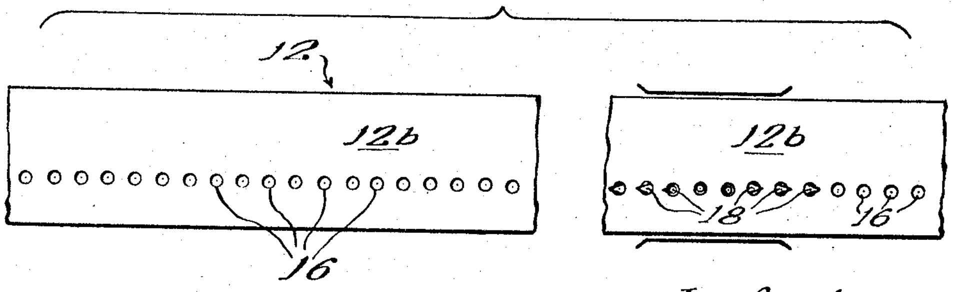
FIGURE 3 is an enlarged fragmentary broken view illustrating pin feeding of the data tape of this invention.

As can be seen clearly in FIGURE 3, the tape is fed through the encoding apparatus by the pin wheel engagement with the control punched holes. Since the holes are punched along a line offset from the longitudinal center line of the tape, this establishes a right and left side to the tape. However, unless it is possible to identify the top and bottom face of the tape, it is possible that the tape could be fed into a sensing machine upside down with the back end, or tail end, of the tape fed in first. Obviously, no intelligible program could be sensed from the tape and certainly not the desired program which has been encoded on the tape. Thus the problem arises in data tape of this type to provide a means for identifying the top and bottom face of the tape without interfering with the qualities of the tape or interrupting the smooth tape surfaces.

To this end, the adhesive layers 26 and 28 are color coded to distinguish the two faces of the tape. In the preferred embodiment, the adhesives 26 and 28 are of a polyester type impregnated with a coal tar dye. Since the aluminum foil strip 24 is in the center, this provides a light barrier making the tape opaque. Also, since the Mylar strips 30 and 32 which form the top layer of the tape are substantially transparent, the color of the adhesive forming the bond between the Mylar layers and the aluminum strip determines the color of the tape. By making one layer of adhesive 26 a different color from the other layer of adhesive 28, a top and bottom face of the tape can be established.

It might be preferred that the bottom face of the tape be provided with a red adhesive to serve as a conventional warning. The top face of the tape might be provided with different colors to indicate different classifications of the program encoded on the tape or for similar identifying purposes. In either event, with a top and bottom face established on the tape by means of the color coded adhesive of the laminate which establishes the color of the tape, and a right and left side established by means of the line offset control punched holes, it can be seen that the definite front and tail end of the tape is established. Thus, the likelihood of tape being fed into a sensing device upside down and backwards is substantially eliminated.

Another added advantage of color coding the adhesive in the laminate tape of this invention is that it affords a means for easy inspection of quality control of the tape being produced. Since the adhesive layer is extremely thin and normally colorless, it is difficult to determine if the adhesive is being uniformly applied over the surface of the aluminum foil center strip. If the adhesive is applied only in spots, this would be extremely difficult to detect and ultimately result in an inferior portion of the data tape. However, by impregnating the normally colorless polyester adhesive with a coal tar dye, simple visual inspection will readily determine whether the adhesive is being properly coated on the surface of the aluminum foil strip.

I claim:

1. In a laminate data tape strip having an aluminum tape-like core and first and second layers of translucent material over either face of the core, wherein said tape is provided with control punched holes along a line offset to one side of the tape longitudinal center line, means for identifying the forward and rear ends of the tape, comprising: a first layer of polyester adhesive with a coal tar dye of one color between the first layer of translucent material and the metallic core and a second layer of polyester adhesive with a coal tar dye of a different color between the second layer of translucent material and the metallic core for distinguishing the top face from the bottom face so that, after said control punched holes have been formed along a line offset from the center line of the tape to establish a left and right side to the tape, the front end of the tape can be distinguished from the tail end of the tape.

References Cited

UNITED STATES PATENTS

| | | | |
|---|---|---|---|
| 1,065,135 | 6/1913 | Ivatts | 33—126 |
| 2,077,242 | 4/1937 | La Pierre | 33—126 |
| 2,661,290 | 12/1953 | Rackett | 95—2 |
| 3,030,013 | 4/1962 | Moodie et al. | 346—136 |
| 2,688,582 | 9/1954 | Phair et al. | 156—253 |
| 3,003,143 | 10/1961 | Beurrier | 340—347 |
| 3,039,746 | 12/1962 | Scharf | 161—220 |
| 3,134,834 | 5/1964 | Tobias et al. | 235—61.12 |
| 3,170,833 | 2/1965 | Noyes | 161—186 |

ROBERT F. BURNETT, *Primary Examiner.*

R. J. ROCHE, *Assistant Examiner.*

U.S. Cl. X.R.

33—137; 161—109, 214; 281—5; 283—61; 346—136